(12) United States Patent
Esser

(10) Patent No.: US 9,802,356 B2
(45) Date of Patent: Oct. 31, 2017

(54) WELDING DEVICE FOR PRODUCING TUBULAR BODIES

(71) Applicant: Packsys Global (Switzerland) Ltd., Rüti (CH)

(72) Inventor: Ulrich Esser, Rüti (CH)

(73) Assignee: Packsys Global (Switzerland) Ltd., Rüti (CH)

( * ) Notice: Subject to any disclaimer, the term of this patent is extended or adjusted under 35 U.S.C. 154(b) by 93 days.

(21) Appl. No.: 14/907,307

(22) PCT Filed: Feb. 5, 2014

(86) PCT No.: PCT/EP2014/052266
§ 371 (c)(1),
(2) Date: Jan. 25, 2016

(87) PCT Pub. No.: WO2015/010796
PCT Pub. Date: Jan. 29, 2015

(65) Prior Publication Data
US 2016/0167290 A1 Jun. 16, 2016

(30) Foreign Application Priority Data
Jul. 25, 2013 (EP) .................................... 13178084

(51) Int. Cl.
*B29C 65/00* (2006.01)
*B29C 65/36* (2006.01)
(Continued)

(52) U.S. Cl.
CPC ............ *B29C 65/368* (2013.01); *B29C 65/32* (2013.01); *B29C 65/3656* (2013.01);
(Continued)

(58) Field of Classification Search
CPC ................................................ Y10T 156/1013
See application file for complete search history.

(56) References Cited

U.S. PATENT DOCUMENTS 3,575,769 A * 4/1971 Radzio ................ B29C 66/8181
156/203
4,123,312 A * 10/1978 Schmid .................. B29C 53/50
156/198
(Continued)

FOREIGN PATENT DOCUMENTS

CH 695 937 10/2006
CN 102490363 A 6/2012
(Continued)

OTHER PUBLICATIONS

International Application No. PCT/EP2014/052266 IPRP dated Jan. 26, 2016.
(Continued)

*Primary Examiner* — Mark A Osele
(74) *Attorney, Agent, or Firm* — Bachman & La Pointe, PC

(57) ABSTRACT

The invention relates to a welding device (1) for producing tubular bodies by the edge-side welding of two substrate edges (2, 3), in particular two laminate edges, said welding device having a continuous, circulating first contact belt (5) for coming into contact with the substrate (4), and an energy source (12, 13) for providing welding energy. According to the invention, the first contact belt (5) has a seamless polyimide contact surface (35) for coming into contact with the substrate (4).

17 Claims, 2 Drawing Sheets

Figure 1:
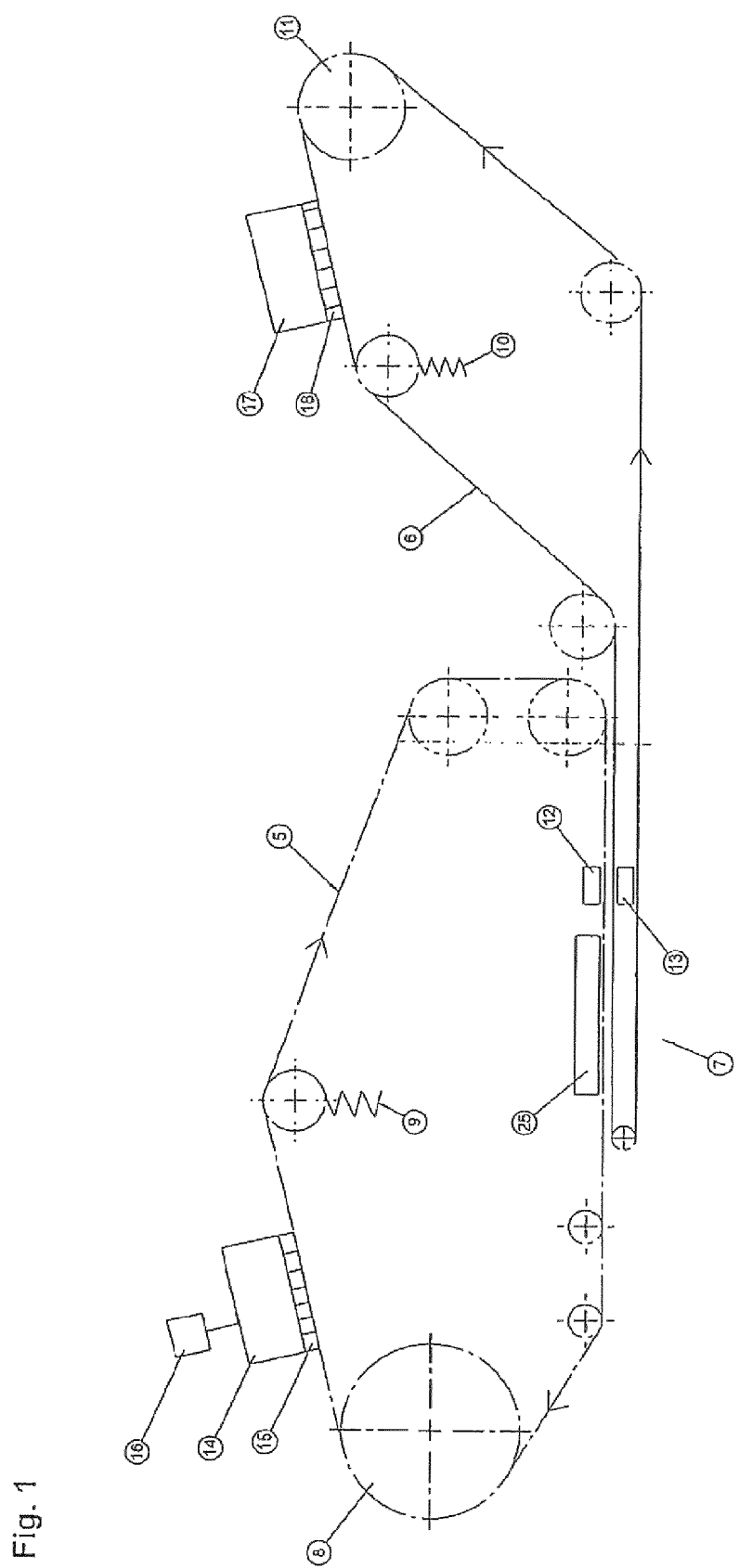

(51) Int. Cl.
*B29C 65/32* (2006.01)
*B29C 53/48* (2006.01)
*B29D 23/20* (2006.01)
*B29L 23/20* (2006.01)
*B29K 105/00* (2006.01)
*B29L 23/00* (2006.01)

(52) U.S. Cl.
CPC .... *B29C 66/0062* (2013.01); *B29C 66/00441* (2013.01); *B29C 66/0342* (2013.01); *B29C 66/1122* (2013.01); *B29C 66/1142* (2013.01); *B29C 66/4322* (2013.01); *B29C 66/49* (2013.01); *B29C 66/723* (2013.01); *B29C 66/8122* (2013.01); *B29C 66/81265* (2013.01); *B29C 66/83423* (2013.01); *B29C 53/48* (2013.01); *B29C 66/72321* (2013.01); *B29C 66/72341* (2013.01); *B29C 66/81871* (2013.01); *B29D 23/20* (2013.01); *B29K 2105/256* (2013.01); *B29K 2879/08* (2013.01); *B29K 2905/00* (2013.01); *B29K 2995/0072* (2013.01); *B29L 2023/00* (2013.01); *B29L 2023/20* (2013.01); *Y10T 156/1013* (2015.01)

(56) References Cited

U.S. PATENT DOCUMENTS

| | | | | |
|---|---|---|---|---|
| 5,310,443 A * | 5/1994 | Burger | .................... | B29C 53/50 156/466 |
| 5,505,813 A * | 4/1996 | Scheifele | ................ | B29C 53/50 156/380.1 |
| 5,569,144 A * | 10/1996 | Schwyn | .................. | B29C 53/50 413/72 |
| 5,942,301 A * | 8/1999 | Schlueter, Jr. | ...... | B29C 65/5057 428/58 |
| 6,751,435 B2 * | 6/2004 | Hsieh | ...................... | B29C 65/56 399/302 |
| 8,470,232 B2 * | 6/2013 | Kurachi | .................. | B29C 39/00 156/304.1 |
| 8,871,320 B2 * | 10/2014 | Bosshardt | ............. | B29C 53/382 264/176.1 |
| 2004/0221943 A1 * | 11/2004 | Yu | ........................ | B29C 65/5042 156/157 |
| 2006/0016501 A1 * | 1/2006 | Benquet | ............. | B29C 66/8181 138/138 |
| 2007/0213157 A1 | 9/2007 | Noda | | |
| 2012/0146265 A1 * | 6/2012 | Wu | ........................ | B29C 41/04 264/463 |
| 2013/0153151 A1 * | 6/2013 | Trest | ...................... | B29C 66/49 156/379.8 |
| 2014/0014271 A1 | 1/2014 | Weber | | |

FOREIGN PATENT DOCUMENTS

| | | | |
|---|---|---|---|
| CN | 102648131 A | 8/2012 | |
| DE | 2623005 A1 * | 12/1977 | ............ B29C 65/18 |
| DE | 38 07 164 | 9/1989 | |
| EP | 0 264 663 | 4/1988 | |
| EP | 0 498 764 | 8/1992 | |
| EP | 2 319 681 | 5/2011 | |
| EP | 2319681 A1 | 5/2011 | |
| EP | 2 502 725 | 9/2012 | |
| JP | 2012106424 A | 6/2012 | |

OTHER PUBLICATIONS

International Application No. PCT/EP2014/052266 search report dated May 26, 2014.

* cited by examiner

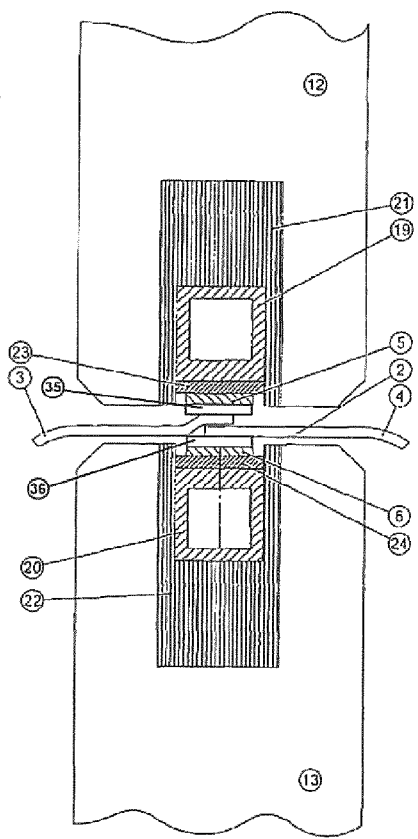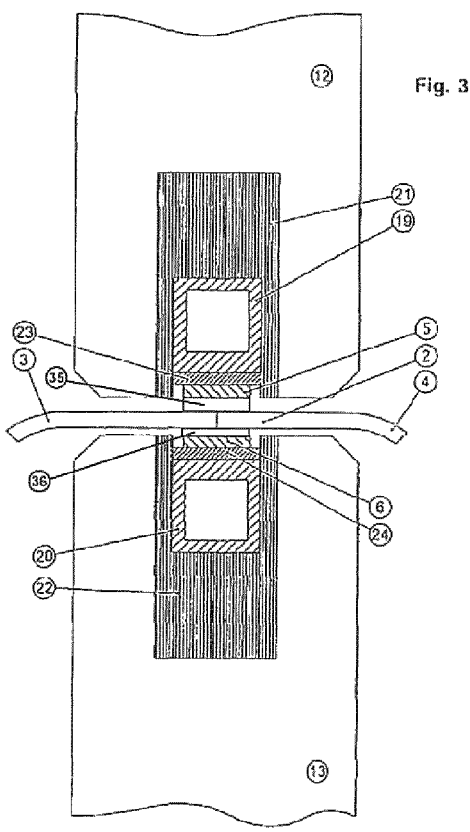

WELDING DEVICE FOR PRODUCING TUBULAR BODIES

The present invention relates to a welding device according to the preamble of claim 1, a contact belt for use in such a welding device and a method according to the preamble of independent claim 14.

It is known from the prior art to manufacture tubular bodies from a substrate by welding two edges of the substrate, wherein the substrate is included and melted between two contact belts, frequently in the form of steel belts heated via an RF radiation source. In this context, the laminate surface melts, with the result that it may adhere to the contact belt, which can impair not only the quality of the tubular bodies produced, particularly the weld seam, but also the welding apparatus itself. Consequently, the welding apparatus may have to be cleaned and/or serviced frequently.

For this reason, in the prior art the steel belts that are used as the welding belts are coated with Teflon (PTFE) to prevent the molten plastic from sticking to the welding belts, but this leaves marks on the weld seams produced. To apply the Teflon layer, the surface of the steel belt is roughened and Teflon is applied under pressure, so that the Teflon adheres mechanically to the steel belt. However, mechanical adhesion is limited, and the Teflon may split off from the steel belt, thus impairing the quality of the tubular bodies, since the Teflon may be deposited not only on the tubular bodies but may also stick more firmly to the steel belt (due to partial loss of the anti-adhesion layer). Teflon is also known for its flow behaviour, that is to say over time Teflon migrates away from the areas under greatest pressure, and consequently over time its thickness decreases over the long term until the belt becomes unusable.

Patent nos. EP 2 319 681 A1, CH 695 937 A5, EP 0 498 764 A1, EP 0 264 663 A2 and EP 2 502 725 A1 describe typical welding apparatuses for making tubular pipe bodies. An essential feature of the known welding apparatuses is that they perform a continuous welding process, that is to say a welding operation in which the substrate to be welded is initially formed into a tubular shape as it is transported forwards, and it is then advanced in a conveying direction relative to the welding apparatus during welding. The contact belts used, particularly welding belts that come into contact with the substrate in the area of the longitudinal edges to be welded are subject to extremely stringent quality requirement—any irregularity in the contact belt surface is visible on the finished weld seam.

From the unrelated field of book cover production, it is known to arrange polyimide film as a separating film between a welding apparatus and a substrate to be welded, as described in DE 38 07 164 A1. Unlike tubular body manufacturing, producing book covers is a clocked process in which the substrate and the welding apparatus are not moved relative to each other during the welding operation. Book cover welding also differs from substrate welding for producing tubular bodies in that the substrates used for welding book covers are substantially wider, and are welded together over considerably larger widths than is the case when manufacturing tubular bodies, in which the substrates only have to be welded at the edges.

Starting from the basis of the prior art, the object underlying the present invention is to improve a species-related welding device, a contact belt for use in such a welding device and a species-related method in such manner that the quality of the tubular bodies produced therewith is improved and the service lives of the welding device are prolonged.

This object is achieved with an apparatus having the features of claim 1, by the use of a contact belt having the features of claim 13 and by a method having the features of independent claim 14; advantageous refinements of the invention are described in the dependent claims. To avoid repetition, features that are disclosed and claimable with reference to the device are to be considered disclosed and claimable with reference to the method, and features that are disclosed and claimable with reference to the method are to be considered disclosed and claimable with reference to the device. Features that relate to the formation of the contact belt as part of the welding device or generally, are to be considered disclosed and claimable not only for a contact belt separately but also for its use in the context of tubular body production and for a welding device equipped with such a contact belt according to claim 1.

In a welding device such as is used in the invention, two substrate edges are welded together, wherein an endless (circumferentially closed) contact belt is in surface contact with the substrate and wherein the substrate is welded by means of an energy source applied to the substrate and/or the contact belt. In this context, the substrate is transported past the energy source.

An inductive element that heats a metal layer may be used as an energy source, for example.

The provision according to the invention of a seamless contact surface containing polyimide on the contact belt will reduce abrasion between the contact belt and the substrate. Moreover, migration such as can occur with PTFE-coated belts is prevented because polyimide is a crosslinked polymer. In this context, the term contact surface is used to describe a surface that is formed and arranged for the purpose of coming into contact with the substrate.

Polyimide is characterized by its low adhesion and at the same time high temperature resistance as well as dimensional stability, also particularly compared with Teflon coatings. The low adhesion counteracts abrasion and thus also degradation of the substrate and/or the welding device. One of the effects of greater temperature resistance is that the process speed can be increased, thereby increasing the efficiency of the welding device. Advantageously, preferably at least 75 percent by weight, more preferably at least 95 percent by weight aromatic polyimides are used as the polyimides for the polyimide contact surface.

In general, the invention has revealed a surprising use of polyimide as a non-stick layer on welding devices for producing tubular bodies, since polyimide is difficult to apply, and at first glance would appear to be less suitable, particularly compared with Teflon, and the advantages of using polyimide in this area are not immediately apparent.

An essential feature of the contact belt—at least one according to the invention—in a welding device according to the invention for producing tubular pipe bodies, consists in the creation of a seamless polyimide contact surface—the absence of a seam is critically important for the process, since any seam would result in an undesirable mark on the weld seam of the manufactured tubular body, because this is a continuous process in which the substrate is transported past the welding device during welding, that is to say initially a quasi-endless tubular body is produced continuously, which body is only cut into individual tubular bodies after the welding operation. A person skilled in the art has no reason whatsoever to use a polyimide foil as is applied in a process from the unrelated field of book cover production, as described in DE 38 071 64 A1, as the contact belt for the process of manufacturing tubular bodies under discussion here, or even to consider the prior art of such an unrelated technical field. A major reason for this is that, unlike the inventive process, the known, unrelated manufacturing process is a clocked method in which the polyimide film is not moved relative to the substrate during welding—through appropriate clocking or controlling of the process, the seams of the polyimide contact surface that are typically present in a polyimide film are positioned so that during the welding they are arranged relative to the substrate such that the weld seams and butt joints do not come into contact with the welded area. Another reason why a person skilled in the art would not have any reason to consider DE 38 071 64 A1 for the purpose of creating a contact belt with a seamless polyimide contact surface is that a seamless polyimide contact surface is extremely difficult to produce. In the event that a continuous contact belt made entirely from polyimide in a manner similar to DE 38 071 64 A1 satisfies the condition of a seamless contact surface, it cannot be manufactured by bonding or welding two ends of a polyimide belt, because the unavoidable result would be a polyimide contact surface containing undesirable seams. Instead, the polyimide belt formed according to the invention must be immediately endless, i.e. created in one piece, for example by applying a polyimide surface coating to the inside of a hollow body, e.g., a hollow cylinder, and then removing the resulting polyimide belt inwardly from the preferably rigid hollow body. In this context, it is advantageous to deposit a releasing agent on the inner surface of the hollow body before applying the polyimide surface coating to enable the polyimide to be separated from the hollow body without causing damage. Alternatively, it is possible to apply a polyimide surface coating to a flexible support, for example to the outside thereof, particularly if a releasing agent is applied first to facilitate the subsequent separation, and to strip the flexible support off the resulting endless, seamless polyimide belt, in an inward direction, for example, after the polyimide surface coating has cured. An individual skilled in the art certainly derives no suggestion from DE 38 070 164 A1 of the alternative variant of the contact belt as a welding belt that contains a metal carrier layer, which may then be provided with the polyimide coating in a complex process, as will be explained in the following. In this case, aromatic tetracarboxylic acid anhydrides and aromatic diamines are preferably converted into a polyamidocarboxylic acid, wherein said solution is applied as a surface coating to the carrier metal layer, particularly a steel belt.

It is conceivable to impregnate the carrier metal with the solution in addition or alternatively to the above, in which case water is separated off and the solvent is evaporated by the application of high temperatures.

A further reason that militates against the transfer of a polyimide foil known from patent no. DE 38 07 164 A1 to a tubular body welding device is the fact that the foil used in the known methods is much wider (width of a book cover), and therefore could not be used with the guides and drive mechanisms implemented in the process, particularly inside a mandrel for guiding the substrate.

According to a further development, each of the two sides of the substrate is preferably in contact with a contact belt, so that a second contact belt is provided in addition to the (first) contact belt described in the preceding. Both contact belts preferably have a contact surface with polyimide for application to the substrate. This ensures that the substrate is guided on both sides, and a shearing force in the substrate is kept small.

The entire contact surface of the first and/or second contact belts preferably consists of polyimide and/or a polyimide-containing material. In this context, the entire contact surface of the first and/or second contact belts is considered to be the sum of all surface sections of the first and/or second contact belts that are formed and arranged to come into direct contact with the substrate. In other words, the first and/or second contact belt, come into contact with the substrate preferably exclusively via a polyimide surface.

The contact surface is preferably applied as a coating to a metal, particularly steel, preferably to an endless steel belt. This has several advantages. Firstly, a coating enables a thinner construction, which in turn enables the heat from the metal to be transported more efficiently to the substrate, with a smaller temperature gradient. Moreover, a separate adhesive layer, which may become detached particularly at high process speeds and/or a high operating temperature, is not necessary. In particular, the coating may be applied directly to the metal and/or optionally over a primer as a single intermediate layer.

In a glued film, a butt joint in the film would be unavoidable, and this would in turn be reflected as an undesirable impression on the weld seam of the tubular bodies produced. A further disadvantage of a butt joint is that a glued belt can begin to separate from the steel belt there.

However, polyimide cannot be processed in the molten form due to its chemical insolubility and crosslinking properties, so a known coating method such as is known from Teflon cannot be transferred. The invention is based on the discovery that a polyimide coating can still be applied to a steel belt by applying the coating in a two-stage process, which is known from the technically remote field of copper wire enamels for producing an insulating layer around an electrically conductive wire, and that said coating is associated in the present field with advantages that justify the possibly more complex production.

The polyimide coating of the polyimide contact surface may be prepared for example by reacting aromatic tetracarboxylic acid anhydrides such as pyromellitic acid dianhydride (1,2,4,5-benzenetetracarboxylic acid dianhydride) or biphenyltetracarboxylic acid dianhydride and aromatic diamines such as 4,4'-diaminodiphenyl ether in an anhydrous polar solvent such as N-methyl-2-pyrrolidone or dimethylformamide to produce a polyamidocarboxylic acid, wherein said solution is applied to the steel belt as a surface coat. Additionally or alternatively, the steel belt may be impregnated with such a solution. When high temperatures are applied, preferably above 300° C., more preferably above 360° C., the reaction forms polyimide, wherein water is released and the solvent evaporates.

In this way, a particularly advantageous embodiment of a contact belt is created, combining the advantages of using polyimide, particularly compared with Teflon, with the advantages of a coating over adhesion of a polyimide film.

A polyimide surface prepared in this way is more resistant to abrasion than a PTFE coating or even the alternative of a bonded polyimide film. As a further alternative, the contact belt may be made completely of polyimide.

The polyimide contact surface is preferably manufactured as a single piece, that is to say already endless, and in particular not welded or glued to obtain a continuous surface. This results in a seamless surface.

The formation of the contact surface consisting partly or entirely of polyimide enables production of a particularly smooth surface on the contact belt, and consequently the weld seam on the tubular bodies produced is also smooth.

However, the contact surface may be roughened deliberately In this way, for example, it becomes possible for the weld seam on the tubular bodies produced to have the same (or similar) roughness as the rest of the surface of the tubular body outside of the weld seam. The contact surface preferably has a surface roughness $R_a$ of between 1 nm and 5 µm.

If the contact belt comprises a metallic layer, it can be used as a welding belt by heating the metallic layer via the energy source, e.g., inductively, with a very rapidly reversing electrical field.

If the substrate comprises a metallic layer, this metallic layer (alternatively or in addition to a metallic layer in the contact belt) may be heated in a corresponding way for welding. Thus, aluminium layers are often used in tubular bodies due to their very effective function as a gas barrier, and can be used here as a heated layer for welding.

The substrate edges can overlap when welding or the substrate edges can be butt welded.

The individual tubular bodies are preferably prepared by cutting a continuous tubular pipe body of the substrate to size.

The first and/or second contact belt preferably has a width between 2 and 40 mm, more preferably between 4 and 20 mm, and/or a lengthwise extension in the circumferential direction (circumferential extension) greater than 1 m, preferably greater than 1.5 m. In this case, the width direction is in particular orthogonal to the circumferential direction and the thickness direction of the contact belt, and is preferably in the same plane as the polyimide contact surface.

Further advantages, features and details of the invention will become apparent from the following description of preferred embodiments and with reference to the drawing.

In the drawing:

FIG. 1 is a schematic representation of a welding device configured as a high frequency welding apparatus for producing tubular bodes for packaging tubes from a substrate, FIG. 2 is a sectional view of a welding device configured as a high frequency welding apparatus in the welding area, and FIG. 3 is a welding device with butted substrate edges.

In the figures, the same elements and elements with the same function are identified with the same reference numerals.

FIG. 1 shows important components of a welding apparatus 1 for edge-welding two substrate edges 2, 3 of a substrate 4 shown in FIG. 2. Substrate edges 2 and 3 are welded together to form a tubular body for a packaging tube.

Welding device 1 comprises a first endless, driven circulating contact belt 5, embodied here as a welding belt with a steel belt coated with polyimide, and a second endless, driven circulating contact belt 6 running partially parallel thereto. Second contact belt 6, the lower belt in the figure, is constructed in the form of steel belt coated with polyimide, forming an "inner welding belt", of which the right section 7 in the drawing plane protrudes into the tubular body to that is to be manufactured—not shown—whereas first contact belt 5 runs along the outer surface. First contact belt 5 is guided over a number of rollers and a first electric motor drive unit is provided for driving first contact belt 5 in the circumferential direction. In addition, a first clamping device 9 is assigned to first contact belt 5 to ensure that first contact belt 5 is clamped according to defined parameters. A second, similarly constructed clamping device 10 is assigned to second contact belt 6. A second electric motor drive unit 11 is also provided.

Overall, device 1 comprises energy sources 12, 13 (first power source 12, second power source 13), each of which has the form of a high-frequency generator and is designed in a manner known per se and can cooperate with the respective contact belt 5, 6. In an area between the opposing power sources 12, 13, the substrate edges—not shown—are welded to each other to form a longitudinal weld seam. A cooling zone 25 formed by a chilled beam for rapidly cooling the joined substrate edges 2, 3 is provided after energy sources 12, 13. Downstream of cooling zone 25, there are cutting means—not shown—for cutting the endless tubular pipe into individual tubular bodies.

First contact belt 5 has been coated with polyimide, in such manner that a contact surface 35 for contacting the substrate consists of polyimide. The coating was prepared by converting aromatic tetracarboxylic acid anhydrides, in the form of pyromellitic acid dianhydride (1,2,4,5-benzenetetracarboxylic acid dianhydride) and aromatic diamines, in the form of 4,4'-diaminodiphenyl ether in an anhydrous polar solvent, in the form of N-methyl-2-pyrrolidone (NMP), into a polyamidocarboxylic acid, and this solution was applied as a surface coating to the steel belt. The conversion to polyimide was effected by applying a temperature above 360° C., wherein was driven off and the solvent evaporated.

FIG. 2 serves merely to illustrate the mode of operation of welding apparatus 1. FIG. 2 shows a schematic sectional view through the weld zone of FIG. 1.

As is shown in FIG. 2, each power source 12, 13 comprises a coil 19, 20 and a ferrite core 21, 22, an insulating layer 23, 24 being arranged between each coil 19, 20 and the associated contact belt 5, 6.

In the present example, two coils 19, 20 are shown. In general, one coil 19 or 20 would suffice.

FIG. 3 shows a welding device 1 in which two butt joined substrate edges 2, 3, which are sandwich clamped by two welding belts 5, 6 circulating at slightly different speeds. Otherwise, the welding device 1 of FIG. 3 corresponds to the welding device 1 shown in FIG. 2.

The invention claimed is:

1. Welding device (1) for producing tubular bodies by edge-side welding of two substrate edges (2, 3),
   having an endless, circulating, first contact belt (5) for coming into contact with the substrate (4),
   having an energy source (12, 13) for providing welding energy,
   and having means for conveying the substrate (4) along the energy source (12, 13) while the substrate edges (2, 3) are welded,
   characterized in that
   the first contact belt (5) has a seamless polyimide contact surface (35) for coming into contact with the substrate (4).

2. Device according to claim 1, characterized in that a second endless, circulating contact belt (6) is provided, which has a seamless polyimide contact surface (36) for coming into contact with the substrate.

3. Device according to claim 2, characterized in that the contact belts (5, 6) are arranged such that the substrate (4) can be clamped, between them, and transported together with the contact belts (5, 6).

4. Device according to claim 2, characterized in that the entire first and/or second contact belt (5 and 6), is made entirely of polyimide.

5. Device according to claim 2, characterized in that the polyimide contact surface (35, 36) of the first and/or second contact belt (5 or 6) is applied to a metal.

6. Device according to claim 5, characterized in that the polyimide of the polyimide contact surface (35, 36) is applied directly to the metal with no interposed adhesive layer, optionally over a primer.

7. Device according to claim 2, characterized in that the polyimide contact surface (35, 36) of the first and/or second contact belt (5 and 6) is roughened, with a roughness $R_a$ between 1 nm and 5 µm.

8. Device according to claim 2, characterized in that at least 50 percent by weight of the polyimide of the polyimide contact surface (35, 36) of the first and/or second contact belt (5 and 6) is an aromatic polyimide.

9. Device according to claim 2, characterized in that the polyimide contact surface (35, 36) of the first and/or second contact belt (5 and 6) is produced by application of a solution containing tetracarboxylic acid anhydrides and diamides and subsequent polycondensation of said solution, at a temperature above 300° C. to yield polyimide.

10. Device according to claim 2, characterized in that the first and/or second contact belt (5 and 6) is produced as a single part, without butt joints, made of polyimide.

11. Device according to claim 2, characterized in that the polyimide contact surface (35, 36) of the first and/or second contact belt (5 and 6) has a layer thickness between 5 and 100 µm.

12. Device according to claim 2 characterized in that the first and/or second endless contact belt has a length greater than 1 m.

13. Device according to claim 2 characterized in that the first and/or second endless contact belt has a width between 2 mm and 50 mm.

14. Use of a welding device (1) according to claim 1 having a substrate (4) that comprises at least one polymer layer, for producing tubular bodies by edge-side welding of two substrate edges (2, 3).

15. Method for producing tubular bodies in which a substrate (4) having two substrate edges (2, 3) is welded on the edge side by a welding device (1), wherein a first endless contact belt (5) is brought into contact with the substrate and wherein the substrate (4) welded by means of an energy source (12, 13) past which the substrate is conveyed during welding, characterized in that the first contact belt (5) comes into contact with the substrate (4), with a seamless polyimide contact surface (35, 36).

16. Method according to claim 15, characterized in that the energy source (12, 13) heats a metal layer in the substrate (4).

17. Method according to claim 15, characterized in that the energy source (12, 13) heats a metal layer in the first contact belt (5) preferably by induction.

* * * * *